United States Patent
Prikkel

(10) Patent No.: US 12,163,565 B2
(45) Date of Patent: Dec. 10, 2024

(54) PROCESS FOR MANUFACTURING A LEAF SPRING AND INSERT FOR LEAF SPRING

(71) Applicant: HENDRICKSON USA, L.L.C., Schaumburg, IL (US)

(72) Inventor: John Prikkel, Englewood, OH (US)

(73) Assignee: Hendrickson USA, L.L.C., Schaumburg, IL (US)

(*) Notice: Subject to any disclaimer, the term of this patent is extended or adjusted under 35 U.S.C. 154(b) by 196 days.

(21) Appl. No.: 17/424,112

(22) PCT Filed: Jan. 17, 2020

(86) PCT No.: PCT/US2020/014150
§ 371 (c)(1),
(2) Date: Jul. 19, 2021

(87) PCT Pub. No.: WO2020/150640
PCT Pub. Date: Jul. 23, 2020

(65) Prior Publication Data
US 2022/0065319 A1    Mar. 3, 2022

Related U.S. Application Data

(60) Provisional application No. 62/793,432, filed on Jan. 17, 2019.

(51) Int. Cl.
*F16F 1/371* (2006.01)
*B29C 70/68* (2006.01)
(Continued)

(52) U.S. Cl.
CPC ............ *F16F 1/371* (2013.01); *B29C 70/681* (2013.01); *F16F 1/368* (2013.01);
(Continued)

(58) Field of Classification Search
CPC .... F16F 1/371; F16F 1/368; F16F 2224/0241; F16F 2226/04; B29C 70/681; B29C 33/0055; B29K 2309/08; B29L 2031/774
(Continued)

(56) References Cited

U.S. PATENT DOCUMENTS 2,557,610 A * 6/1951 Meyers ..................... F16F 3/12
267/140.4
4,198,037 A * 4/1980 Anderson ............. B29C 66/742
267/153
(Continued)

FOREIGN PATENT DOCUMENTS

DE    102019203761 A1 * 9/2020 ........... B60G 11/113
FR    2587649 A * 3/1987 ......... B29C 33/0055
(Continued)

OTHER PUBLICATIONS

International Search Report and Written Opinion Issued by the International Search Authority for International Application No. PCT/US2020/014150, dated Apr. 22, 2020 (10 pages).

*Primary Examiner* — Xuan Lan Nguyen
(74) *Attorney, Agent, or Firm* — Cook Alex Ltd.

(57) ABSTRACT

An insert to a mold for a leaf spring comprises a substrate and a hole that extends through the substrate, A post protrudes from the substrate such that the insert, may be coupled to the mold. Further, the post covers the hole on a first end, so the hole is not exposed. On the other end of the hole, a thin overlay that covers the hole. Thus, during a process where resin is added to the mold, no resin enters the hole. The insert, when added to a leaf spring, offers reinforcement on areas where there is high stress. Therefore, holes may be added to a leaf spring at areas of high stress without overly weakening the leaf spring.

12 Claims, 3 Drawing Sheets

(51) Int. Cl.
*F16F 1/368* (2006.01)
*B29K 309/08* (2006.01)
*B29L 31/00* (2006.01)

(52) U.S. Cl.
CPC ..... *B29K 2309/08* (2013.01); *B29L 2031/774* (2013.01); *F16F 2224/0241* (2013.01); *F16F 2226/04* (2013.01)

(58) Field of Classification Search
USPC .............................................. 267/47, 30, 52
See application file for complete search history.

(56) References Cited

U.S. PATENT DOCUMENTS

| | | | |
|---|---|---|---|
| 4,519,591 A | 5/1985 | Bush et al. | |
| 6,530,587 B2 | 3/2003 | Lawson et al. | |
| 2014/0284856 A1 | 9/2014 | Stay | |
| 2020/0207169 A1* | 7/2020 | Jo | ..................... B29C 45/14311 |

FOREIGN PATENT DOCUMENTS

| | | | | |
|---|---|---|---|---|
| GB | 2125514 A | | 3/1984 | |
| JP | 58118341 A | * | 7/1983 | .............. F16F 1/368 |
| JP | 61119826 A | * | 6/1986 | .............. F16F 1/368 |
| JP | 04362330 A | * | 12/1992 | .............. B60G 11/02 |
| JP | 2002122169 A | | 4/2002 | |

* cited by examiner

US 12,163,565 B2

PROCESS FOR MANUFACTURING A LEAF SPRING AND INSERT FOR LEAF SPRING

CROSS-REFERENCE TO RELATED APPLICATIONS

The present application is a U.S. national stage application of International Patent Application No. PCT/U.S. Pat. No. 202019/04150, filed Jan. 17, 2020, which claims the benefit of U.S. Provisional Application No. 62/793,432, filed Jan. 17, 2019, both of which are hereby incorporated herein by reference.

FIELD OF THE INVENTION

Various aspects of the present invention relate generally to leaf springs and more specifically to fiberglass leaf springs used in automotive applications.

A leaf spring is a suspension device used in heavy commercial vehicles such as vans, trucks, and rail cars. To provide suspension, the leaf spring spreads a load widely over the vehicle's frame. In contrast, a coil spring transfers the load to a single point on the frame. The leaf spring is basically a slightly arced hand that bends (e.g., straightens out) to provide a cushioning effect.

BRIEF SUMMARY

According to aspects of the present disclosure, an insert to a mold for a leaf spring comprises a substrate and a hole that extends through the substrate. A post protrudes from the substrate such that the insert may be coupled to the mold. Further, the post covers the hole on a first end, so the hole is not exposed. On the other end of the hole, a thin overlay that covers the hole. Thus, during a process where resin is added to the mold, no resin enters the hole. The insert, when added to a leaf spring, offers reinforcement on areas where there is high stress. Therefore, holes may be added to a leaf spring at areas of high stress without overly weakening the leaf spring.

According to further aspects of the present disclosure, a process for creating a leaf spring comprises coupling the insert to the mold via the posts and adding resin and fiberglass to the mold. The resin is cured, and the insert adheres to the leaf spring. The leaf spring is removed from the mold and the overlay and the post(s) are removed from the insert, which exposes the holes of the insert. Thus, the insert is integrated into the leaf spring.

BRIEF DESCRIPTION OF THE SEVERAL VIEW OF THE DRAWINGS

DETAILED DESCRIPTION

A leaf spring with an insert made from a material other than fiberglass is disclosed herein. The insert is placed in an area of high stress to allow holes to be put in the leaf spring at the area of high stress. During manufacturing of the leaf spring, the insert is coupled to a mold. After resin and fiberglass are added to the mold and cured, portions of the insert are removed, while a majority of the insert is left as part of the leaf spring. The insert includes holes sized for a coupler that allows the spring to be coupled to a suspension of a vehicle. When stresses act upon the leaf spring, the coupler through the holes wears less on the insert than the coupler would through holes directly in the fiberglass. Therefore, the insert offers reinforcement to areas of high stress in a leaf spring.

Figure 1:
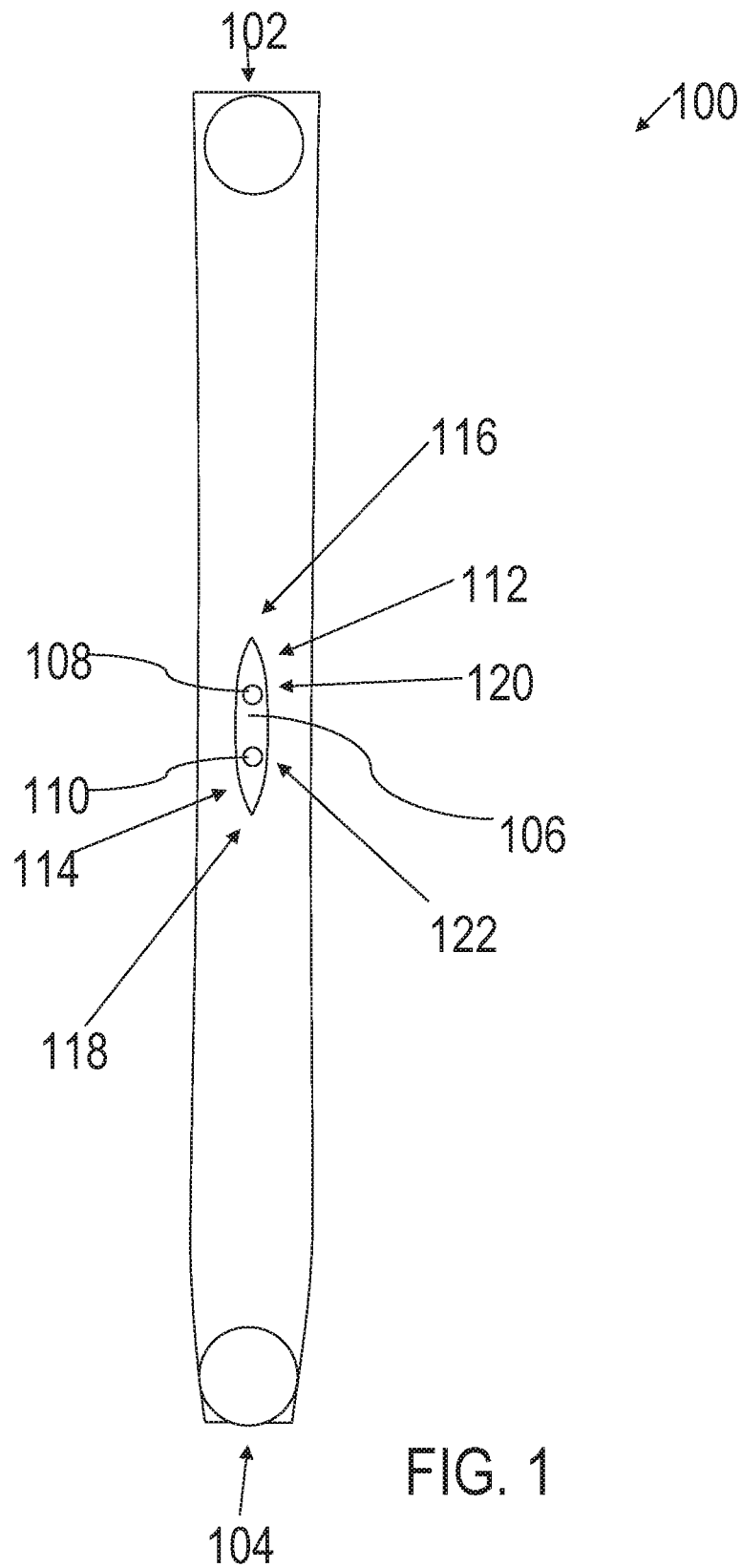
FIG. 1 is a drawing of a leaf spring with an insert, according to various aspects of the present disclosure.

Turning now to the figures, and in particular FIG. 1, a leaf spring 100 includes a first end 102 and a second end 104. Further, the leaf spring 100 includes an insert 106 embedded in the leaf spring 100. As shown, the insert includes two holes 108, 110 for a coupler (not shown) that couples the leaf spring to a vehicle suspension. However, if a desired coupler has a different number of holes (e.g., one hole, three holes, four holes, etc.), then the insert would include a corresponding number of holes 108, 110.

As shown in FIG. 1, the insert 106 includes two tapered portions 112, 114 that each end in a point 116, 118. This tapering 112, 114 allows the fiberglass to properly bind to the insert 106 to help adhesion of the insert 106 to the fiberglass. Further, as shown in FIG. 1, the insert includes rounded portions 120, 122 that transition from a center of the insert 106 to the tapered portions 112, 114.

The insert 106 can be made using additive manufacturing, where the insert 106 is made out of a material other than fiberglass. As the vehicle travels, stress is applied to the leaf spring and possibly to the insert by the vehicle, the coupler to the vehicle, or both. Thus, the insert preferably is made from a material that will not be damaged by high stresses from vehicle usage working upon the leaf spring.

The insert offers reinforcement to areas of high stress (e.g., a point where the leaf spring flexes, a point where the leaf spring couples to the vehicle, etc.) in a leaf spring.

Figure 2:
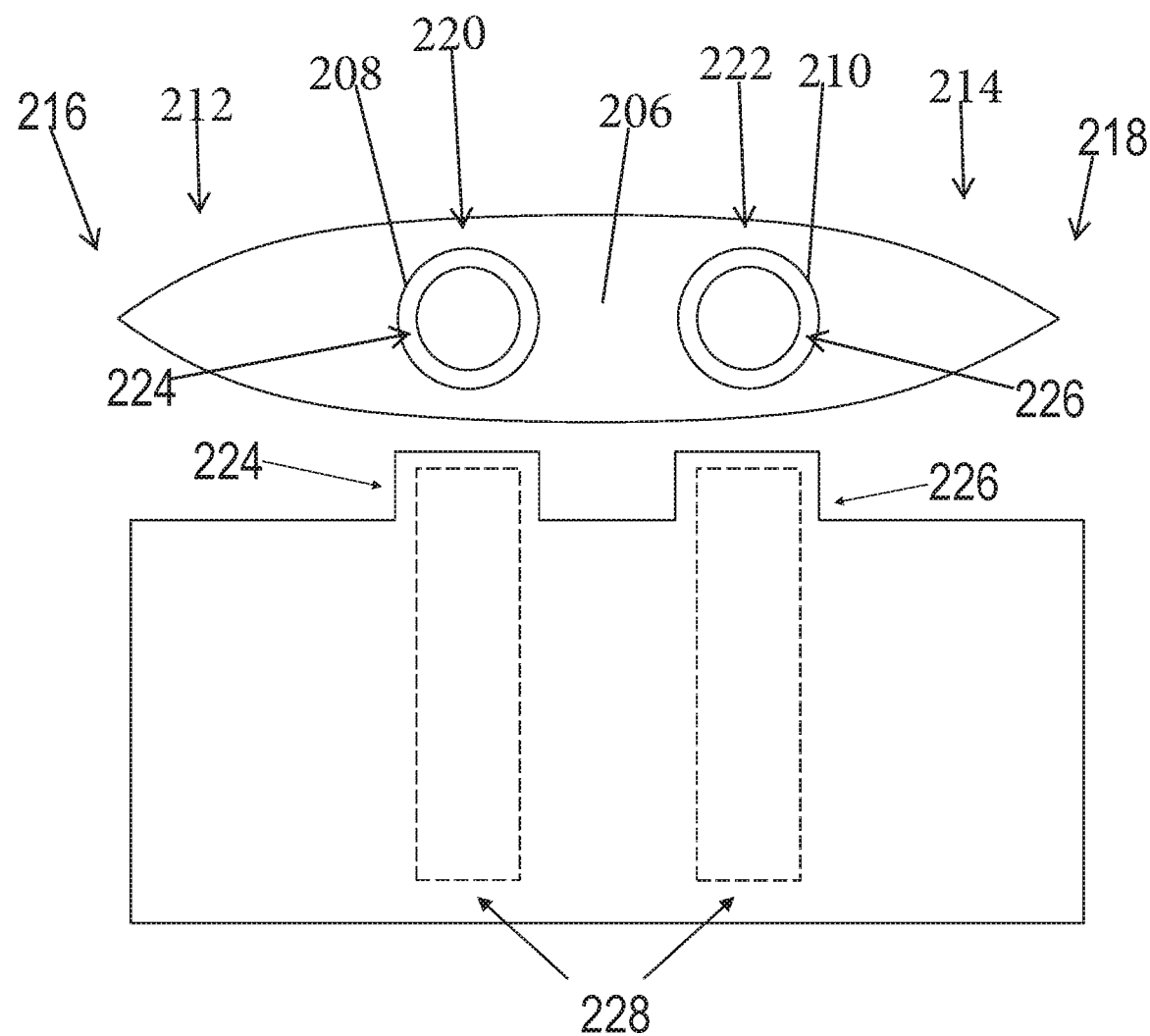
FIG. 2A is a top view drawing of an insert for a leaf spring, according to various aspects of the present disclosure.
FIG. 2B is a side view drawing of an insert for a leaf spring according to various aspects of the present disclosure.

FIG. 2A and FIG. 2B illustrate respectively, a top view and a side view of the insert 206 before the insert 206 is coupled to a mold for creating the leaf spring (100) of FIG. 1. The insert 206 includes the holes 208, 210; the tapered portions 212, 214; the points 216, 218; and the rounded transitions 220, 222 as described in FIG. 1. Further, the insert 206 includes posts 224, 226 that extend about the holes 208, 210. These posts 224, 226 allow the insert to be coupled securely to the mold. Further, there is a thin overlay 228 (e.g., plastic) over the holes 208, 210 on the other side of the insert 206. Therefore, the post covers the hole on a first end, so the hole is not exposed.

Before and while the insert 206 is coupled to the mold, the holes 208, 210 are enclosed in plastic. Thus, when resin is added to the mold for curing, no resin will enter the holes 208, 210. When the resin has cured, the thin overlay 228 and the posts 224, 226 are removed from the leaf spring, exposing the interior of the holes 208, 210.

Figure 3:
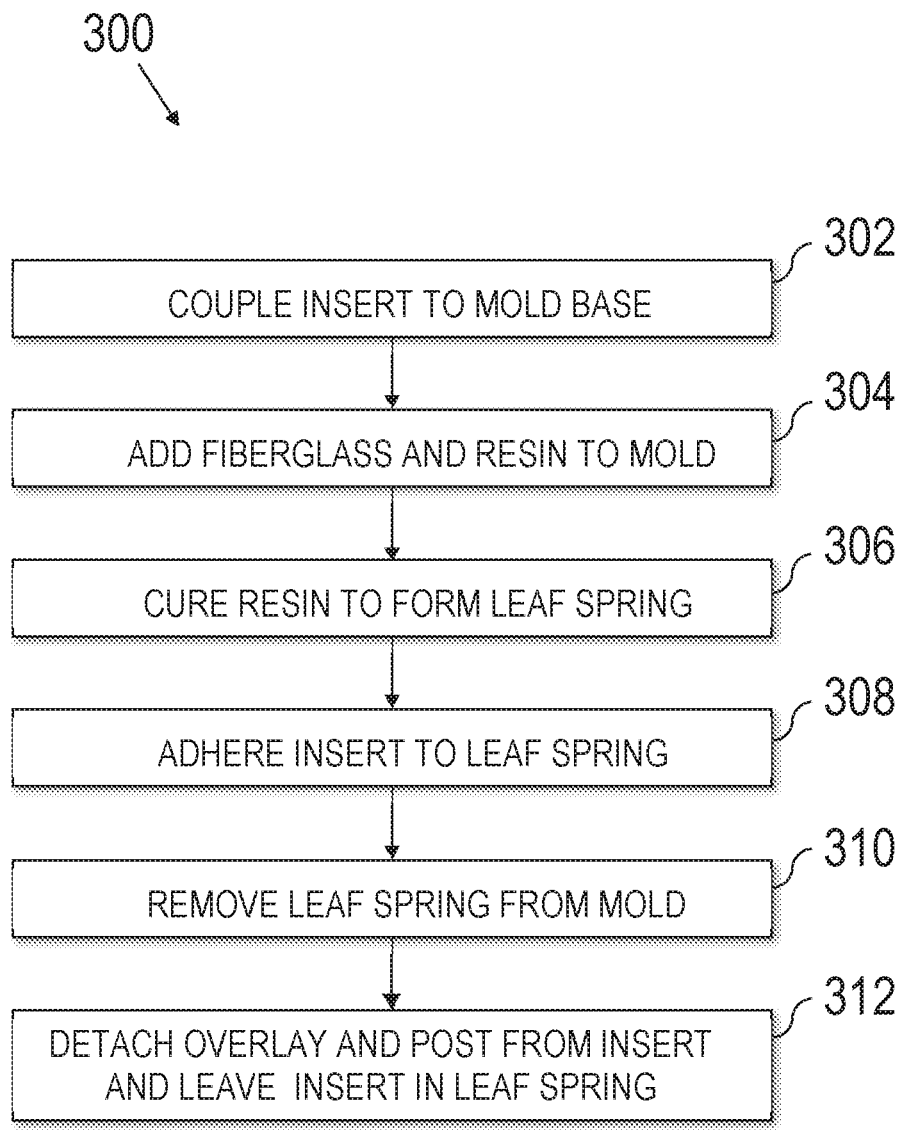
FIG. 3 is a flow chart illustrating a process for creating a fiberglass leaf spring using an insert, according to various aspects of the present disclosure.

FIG. 3 is a flowchart illustrating a process 300 for creating a leaf spring. At 302, an insert (e.g., the insert of FIG. 2A and FIG. 2B), is coupled to a mold of a leaf spring. The insert includes a substrate, a hole (preferably more than one hole) in the substrate, a post that extends from the substrate and covers the hole, and a thin overlay that covers the hole on an opposite end of the hole. Thus, the hole is encapsulated and is not open to space outside the insert. The posts allow the insert to be coupled to the mold.

Once the insert is coupled to the mold, at 304, resin and fiberglass is added to the mold to shape a leaf spring.

Because the holes are sealed off from the outside by the posts and the overlay, the resin will not enter the holes. At 306, the resin and fiberglass mixture is cured to form the leaf spring.

At 308, the insert is adhered to the leaf spring. For example, the curing process may adhere the insert to the leaf spring, or a plasma treating process may be used to adhere the insert the leaf spring.

At 310, the leaf spring is removed from the mold.

At 312, the thin overlay and the post(s) are detached from the insert. This, the final leaf spring still includes the insert without the overlay and the post(s), and the holes are exposed to the outside.

The steps of the process may be performed in any order that makes sense. For example, detaching the overlay and post(s) at 312 may be performed before or simultaneously to the leaf spring being removed from the mold at 310. As another example, detaching the overlay and post(s) at 312 may be performed before adhering the insert to the leaf spring at 308.

The resulting leaf spring is similar to the leaf spring of FIG. 1. As disclosed above, the leaf spring resulting from this process includes the insert, which provides for holes to be placed in a leaf spring at areas of high stress. In leaf springs that do not include this novel insert, the holes may produce a weak point at areas of high stress which may cause the leaf spring to fail. The novel insert reduces failure in leaf springs.

Further, by using the insert, there is no need to cut the fibers of the leaf spring to make a hole within the leaf spring, because cutting the fibers can weaken the leaf spring at the point where the fibers are cut/removed. By using the insert, the fibers are constant, so the properties of the leaf spring may be maintained.

The flowchart and block diagrams in the Figures illustrate the architecture, functionality, and operation of possible implementations of systems, methods and computer program products according to various embodiments of the present disclosure.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for creating a leaf spring, the process comprising:
   coupling an insert into a mold base, wherein the insert comprises:
      a substrate;
      a hole within the substrate, wherein the hole extends through the substrate;
      a post that protrudes from the substrate to allow the insert to be coupled to the mold, wherein the post covers the hole on a first end, so the hole is not exposed;
      a thin overlay that covers the hole on a second end opposite of the first end;
   adding fiberglass and resin to the mold;
   curing the resin to form a leaf spring;
   adhering the insert to the leaf spring;
   removing the leaf spring from the mold; and
   detaching the thin overlay and the post from the insert, while leaving the insert in the leaf spring.

2. The process of claim 1, wherein the insert tapers at opposite ends.

3. The process of claim 2, wherein the insert tapers to a point at both of the opposite ends.

4. The process of claim 1, wherein the insert includes rounded edges between opposite ends.

5. The process of claim 1, wherein the insert includes a second hole in the substrate.

6. The process of claim 5, wherein the insert includes a third hole in the substrate.

7. An insert to a mold for leaf spring, wherein the insert becomes part of the leaf spring forming an assembly, wherein the assembly comprises:
   a substrate;
   a hole within the substrate, wherein the hole extends through the substrate;
   a post that protrudes from the substrate to allow the insert to be coupled to the mold, wherein the post covers the hole on a first end, so the hole is not exposed and a thin overlay covers the hole on a second end opposite of the first end,
   and wherein the insert is embedded in the leaf spring.

8. The insert of claim 7, wherein the insert tapers at opposite ends.

9. The insert of claim 8, wherein the insert tapers to a point at both of the opposite ends.

10. The insert of claim 7 further including rounded edges between opposite ends.

11. The insert of claim 7 further including a second hole in the substrate.

12. The insert of claim 11 further including a third hole in the substrate.

\* \* \* \* \*